US010865347B2

(12) United States Patent
Bartolini

(10) Patent No.: US 10,865,347 B2
(45) Date of Patent: Dec. 15, 2020

(54) PROCESS FOR THE TREATMENT OF REFINERY PURGE STREAMS

(71) Applicant: ENI S.p.A., Rome (IT)

(72) Inventor: Andrea Bartolini, San Giuliano Milanese (IT)

(73) Assignee: ENI S.p.A., Rome (IT)

(*) Notice: Subject to any disclaimer, the term of this patent is extended or adjusted under 35 U.S.C. 154(b) by 0 days.

(21) Appl. No.: 15/781,503

(22) PCT Filed: Dec. 21, 2016

(86) PCT No.: PCT/IB2016/057891
§ 371 (c)(1),
(2) Date: Jun. 5, 2018

(87) PCT Pub. No.: WO2017/109728
PCT Pub. Date: Jun. 29, 2017

(65) Prior Publication Data
US 2018/0273856 A1  Sep. 27, 2018

(30) Foreign Application Priority Data
Dec. 22, 2015 (IT) .............................. 10201586505

(51) Int. Cl.
C10G 31/10 (2006.01)
C10G 31/06 (2006.01)
(Continued)

(52) U.S. Cl.
CPC ........... *C10G 31/10* (2013.01); *B01D 63/022* (2013.01); *B01J 23/94* (2013.01); *C10G 21/003* (2013.01);
(Continued)

(58) Field of Classification Search
CPC ...... C10G 31/10; C10G 31/06; C10G 21/003; C10G 21/12; C10G 21/14; B01D 63/022; B01J 23/94
See application file for complete search history.

(56) References Cited

U.S. PATENT DOCUMENTS

| 4,732,664 A | 3/1988 | Solari Martini et al. |
| 2006/0163115 A1 | 7/2006 | Montanari et al. |
| (Continued) | | |

FOREIGN PATENT DOCUMENTS

WO   WO 2009/070778 A2   6/2009

OTHER PUBLICATIONS

International Search Report and Written Opinion dated Mar. 13, 2017 in PCT/IB2016/057891, 11 pages.
(Continued)

*Primary Examiner* — Michelle Stein
(74) *Attorney, Agent, or Firm* — Oblon, McClelland, Maier & Neustadt, L.L.P.

(57) ABSTRACT

The present invention relates to a process for the treatment of refinery purge streams, containing a hydrocarbon component in slurry phase having a boiling point higher than or equal to 140° C., characterized by the presence of quantities of asphaltenes higher than or equal to 5% by weight and characterized by the presence of a solid content higher than or equal to 5% by weight. The process provides that said purge be mixed with a suitable fluxing agent according to appropriate ratios and under certain conditions, forming a suspension with a content higher than or equal to 10% by weight of compounds having a boiling point TbP lower than or equal to 350° C. After mixing, the suspension is sent to a liquid/solid separation step which operates under suitable conditions, separating a solid phase containing a residual organic component and a solid component, called cake, and
(Continued)

a liquid phase containing residual solids. The solid phase obtained is cooled to below 60° C., including the upper extreme, forming a granular solid which is stored and maintained at a temperature lower than or equal to 60° C.

8 Claims, 1 Drawing Sheet

(51) Int. Cl.
    *C10G 21/00*       (2006.01)
    *C10G 21/14*       (2006.01)
    *C10G 21/12*       (2006.01)
    *B01D 63/02*       (2006.01)
    *B01J 23/94*       (2006.01)

(52) U.S. Cl.
    CPC ............ *C10G 21/12* (2013.01); *C10G 21/14* (2013.01); *C10G 31/06* (2013.01)

(56) References Cited

U.S. PATENT DOCUMENTS

| | | | |
|---|---|---|---|
| 2010/0167912 A1* | 7/2010 | Odueyungbo | B01D 63/02 502/56 |
| 2012/0134899 A1 | 5/2012 | Bartolini et al. | |
| 2012/0198718 A1 | 8/2012 | Odueyungbo | |
| 2012/0279358 A1* | 11/2012 | Bartolini | C10G 21/06 75/743 |
| 2013/0247406 A1 | 9/2013 | Odueyungbo | |

OTHER PUBLICATIONS

Office Action/Search Report as received in the corresponding CN patent application No. 2016800748325 dated Aug. 5, 2020 w/English Translation, 19 pages.

\* cited by examiner

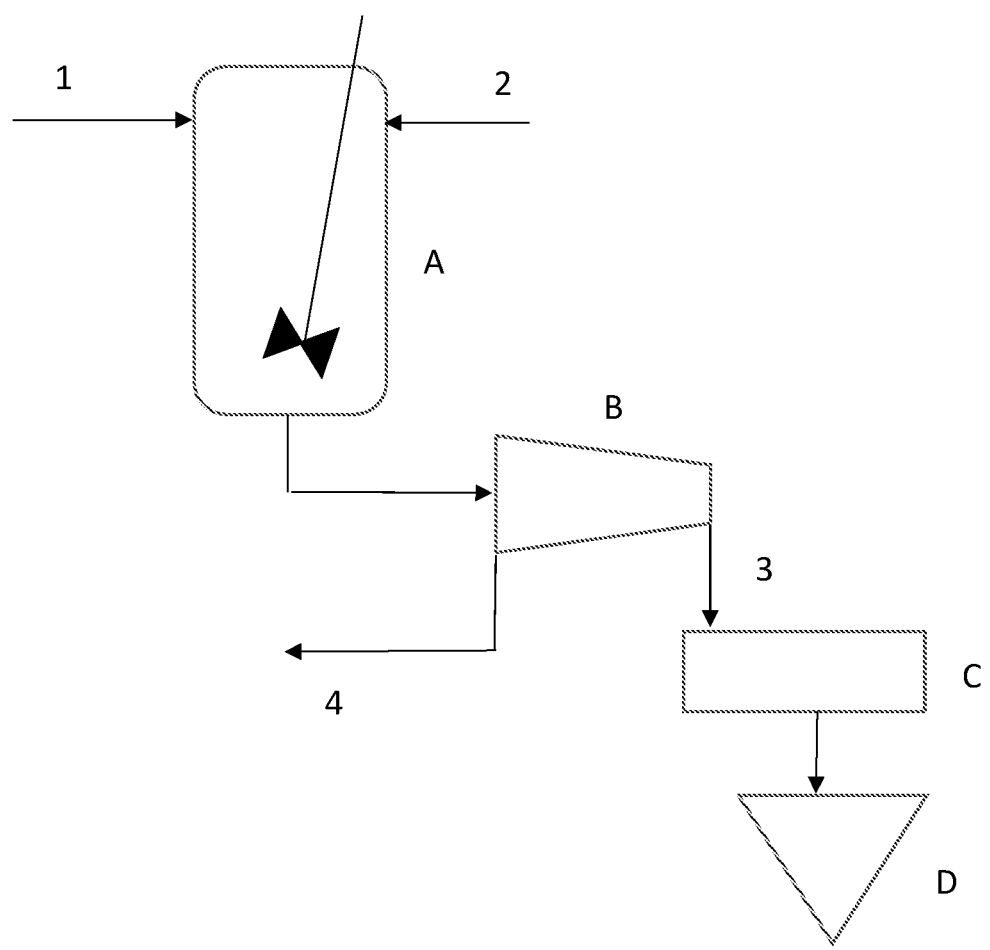

PROCESS FOR THE TREATMENT OF REFINERY PURGE STREAMS

The present invention relates to a process for the treatment of refinery purge streams, characterized by the presence of solid contents higher than or equal to 5% by weight and by the presence of quantities of asphaltenes higher than or equal to 5% by weight, considered as being significant quantities by a skilled person in the art.

Said process is aimed at separating a solid granular phase, or granular solid, and with a final solid content higher than or equal to 30% by weight. The granular solid is obtained after cooling to 60° C., giving the same the characteristic of being "shovelable" (semi-solid sludge), according to the definition contained in the legislative decree 152/2006. This type of solid is granular, non-sticky and flowing and can therefore be easily transported. In order to maintain this feature, the granular solid produced must be kept at a temperature lower than or equal to 60° C. In particular, this process is applied to purge streams coming from hydroconversion processes in slurry phase.

For the purposes of the present invention, the term "solid" refers to the fraction insoluble in tetrahydrofuran, indicated with the abbreviation THF-i.

For the purposes of the present invention, the term "asphaltenes" refers to the fraction soluble in tetrahydrofuran, but insoluble in n-pentane, indicated with the term Asf-C5.

For the purposes of the present invention, maltene component refers to the fraction soluble in both tetrahydrofuran and in n-pentane.

For the purposes of the present invention, "organic fraction" refers to the sum of the components soluble in tetrahydrofuran, therefore the sum of the asphaltene and maltene components.

For the purposes of the present invention, all the operational conditions indicated in the text should be considered as being preferred conditions, even if not expressly declared.

For the purposes of the present invention, the term "comprising" or "including" also comprises the term "consisting in" or "essentially consisting of".

For the purposes of the present invention, the definitions of the ranges always comprise the extremes, unless otherwise specified.

Patent application WO 2014/025561 describes a process for recovering a catalyst by hydrocracking from an effluent coming from a slurry hydrocracking area.

This process envisages that the effluent be separated into a first stream containing the solvent and a clarified product (pitch), and a second stream containing pitch and catalyst. The separation can be effected by centrifugation, filtration, decanting or electrostatic separation. The second stream is subjected to leaching with acid so as to extract the catalyst and form an aqueous solution and a residue. The aqueous solution is then treated with anions to form an insoluble salt, the catalyst, and a further aqueous solution. WO 2014/025561, however, does not describe methods for controlling the rheology of the phase containing the separated catalyst.

US 2013/0247406 describes an integrated process comprising:
an upgrading process of the heavy crudes to convert them into lighter products, in the presence of a catalyst;
a deoiling process wherein the heavy residues and heaviest products, coming from the treatment of heavy crude oils, are separated from the exhausted catalyst which is subsequently collected;
a synthesis area of the catalyst.

The separation of the catalyst is effected through treatment with membrane filtration technologies, and a subsequent thermal devolatilization step.

US 2013/0247406 does not provide any information on the problems relating to the formation of asphaltene deposits on the filtration apparatus; it is held that the simple vibration is not sufficient for avoiding the accumulation of deposits on the filtering membranes. Furthermore, the process requires the application of thermal deoiling steps and relative treatment on the fumes developed.

U.S. Pat. No. 8,470,251 describes a process for the treatment of crude oils by means of hydroconversion wherein a slurry stream coming from hydrocracking is treated under vacuum in a first distillation column, forming three fractions among which a first residue having a boiling point higher than 450° C. (pitch). This residue is subsequently treated in a second distillation column under vacuum to remove the content of Heavy Vacuum Gas Oil (HVGO) up to a maximum of 14% by weight, thus forming a second residue (pitch) which is sent for granulation.

WO 2009/070778 describes a method for the recovery of metals of an exhausted catalyst used in an upgrading slurry process of heavy oils. According to WO 2009/070778, the phase containing the exhausted catalyst is subjected to pyrolysis and the pyrolysis residue is put in contact with a leaching solution containing ammonia and with air, in order to dissolve the metals of groups VIB and VIII, and form a pressurized slurry. Said slurry contains at least one soluble metal complex of group VIB and VIII, ammonium sulfate and a solid residue containing at least one metal complex of the group VB and coke.

The residual solid containing ammonium metavanadate and coke from the pressurized slurry is subsequently separated and removed. A portion of the metals of group VIII is precipitated. The precipitation is carried out at a pre-established pH for selectively precipitating a portion of the complexes of metals of groups VIB and VIII.

US 2010/0122938 relates to a process for separating ultrafine hydrocracking solid catalysts from a liquid slurry of hydrocarbons, said solids being present in a quantity ranging from 5% to 40% by weight. The process comprises the following steps:
cooling a slurry stream containing hydrocarbons and solids, preferably to a temperature ranging from 55° C. to 75° C.;
mixing said cooled stream with a solvent in a solvent/slurry weight ratio ranging from 3:1 to 1:3, to form a first mixture containing liquid hydrocarbons, solvent and a stream containing the heavy hydrocarbon that encapsulates the solid of the catalyst;
separating the first mixture in a first centrifuge to form a second mixture containing a low concentration of heavy hydrocarbon that encapsulates the solid of the catalyst, and a third mixture containing heavy hydrocarbon that encapsulates the solid of the catalyst;
separating the second mixture in at least a second centrifuge to form a fourth mixture containing solvent and liquid hydrocarbons, and a fifth mixture containing a significant concentration of heavy hydrocarbon that encapsulates the solid of the catalyst;
mixing the third mixture and the fifth mixture forming a final mixture;
drying the final mixture to form a mixture of hydrocarbons with impurities in vapour phase and a solid coke-type residue;

separating the impurities from the hydrocarbons and recovering the solid residue.

U.S. Pat. No. 7,790,646 describes a process for converting fine catalysts, present in a quantity ranging from 5 to 40% by weight, and contained in a slurry stream together with heavy oils, into coke-type materials, from which the metals of the catalyst are then recovered. The process comprises the following steps:

mixing a slurry containing heavy oils and an exhausted catalyst, containing sulfides of metals of groups VIII and VI, with a solvent, preferably in a volumetric ratio ranging from 0.5/1 to 5/1, preferably at a temperature ranging from 25° C. to 80° C., thus causing the asphaltenes to precipitate;

separating, preferably by decanting and/or centrifugation, the exhausted catalyst and precipitated asphaltenes from the heavy oils and from the solvent;

converting the precipitated asphaltenes into coke-type materials containing metals which are recovered by thermal pyrolysis.

EP 2440635 describes a process for recovering metals from a stream rich in hydrocarbons and carbonaceous residues, which comprises the following steps:

sending said stream to a primary treatment, effected in one or more steps, wherein said stream is treated in the presence of a fluxing agent in an appropriate apparatus, at a temperature ranging from 80° C. to 180° C. and subjected to a liquid/solid separation to obtain a clarified product consisting of liquids and a cake;

optionally subjecting said separated cake to drying to remove the hydrocarbon component which has a boiling point lower than a temperature ranging from 300° C. to 350° C. from a cake;

sending said cake, optionally dried, to a secondary thermal treatment which comprises:
a flameless pyrolysis at a temperature ranging from 400° C. to 800° C.;
an oxidation of the pyrolysis residue effected under oxidation conditions and at a temperature ranging from 400° C. to 800° C.

The article "Energy Fuels 2011, 25, 3060-3067" describes the effect of the content of asphaltenes on the softening point of a bitumen.

Patent application US 2010/0326887 describes the separation of a non-sticky pitch from a hydrocarbon slurry, by means of a distillation treatment that brings the content of Vacuum Gas Oil (VGO) in the final product to below 14% by weight. The element which distinguishes the present invention from US 2010/0326887, in addition to the equipment used, is the way in which the solids are recovered: in the above-mentioned patent application, the solids are concentrated on the bottom of the column to give pitch, whereas according to the present invention, a part of the solids goes into the cake and a part remains in the clarified product.

Traditionally, a cake obtained from solid-liquid separation, also operating under heat, can show adhesion properties linked to the residual organic phase. Among the numerous reasons behind this rheology, the rheology of the liquid phase and the sub-millimetric dimensions of the solids present can be mentioned, which hinder an optimal drainage of the liquid hydrocarbon phase from the cake produced. An improvement in its characteristics requires further expedients such as the use of significant quantities of liquids for washing the cake, with a negative impact on the dimensioning of the unit and the volumes of liquid produced. The washing liquid is usually separated from the hydrocarbon extracted by distillation, an increase in the volume to be treated leads to an increase in the energy consumption necessary for the separation. A further negative impact is the necessity of having to adopt further treatments downstream of the separation such as, for example, a thermal treatment on a drum dryer or paddle dryer; or solvent extraction treatment, for example light aromatics, propane, $CO_2$, effected on the cake, of all or part of the hydrocarbon component; or subsequent re-dispersion treatment of the cake and centrifugation of the resulting slurry, as described, for example in EP 2440635.

Treatments based on flocculation of the asphaltene phase have significant critical aspects associated with the movement of the products generated; a flocculation of the asphaltenes not adequately controlled can, in fact, cause both the formation of tough deposits on the walls of the apparatus itself or in correspondence with the re-entry point of the clarified product, as is the case for the processes described in US 2010/0122938 and U.S. Pat. No. 7,790,646.

Thermal drying or pyrolysis post-treatment of the cake allows a product suitable for storage and transportation to be obtained, however it leads to an increase in the capex associated to the plant, and requires a further unit for treating the gaseous effluents produced, for example a vapour condenser and/or post-combustor following by removal processes of the sulfur and nitrogen oxides typically present in combustion fumes (deSOx and deNOx processes). Furthermore, these solutions in any case entail transport management and possible intermediate storage of the product.

The use of these technologies is justified when there are stringent specifications on the final product, such as, for example, a limit to the content of volatile products or a high softening point.

Extraction treatments on the cake also allow a final product with a good rheology to be obtained, in addition to a greater recovery of the hydrocarbon fraction, however it has the above-mentioned negative aspects with respect to the solute-solvent separation costs, movement of the material entering the extractors and, in the case of extraction with $CO_2$, high compression costs of the same $CO_2$.

In order to overcome these drawbacks and limitations of the known art, the Applicant has found a new management mode of the solid-liquid separation step of a purge coming from a refinery. This new mode allows the critical aspects associated with the management of the solid produced after separation (cake), caused by the rheological characteristics of the solid formed, to be economically solved.

The present invention discloses how to obtain a granular product having a "solid" consistency with a high THF-i content and with good characteristics for being stored and transported.

An object of the present patent application therefore relates to a process for the treatment of refinery purge streams, which, for the purposes of the present invention, is a hydrocarbon stream in slurry phase having a boiling point higher than or equal to 140° C., characterized by the presence of quantities of asphaltenes higher than or equal to 5% by weight and characterized by the presence of solid contents higher than or equal to 5% by weight.

Said process comprises the following steps:
a) withdrawing a refinery purge stream, said stream being a hydrocarbon stream in slurry phase having a boiling point higher than or equal to 140° C., characterized by the presence of quantities of asphaltenes higher than or equal to 5% by weight and characterized by the presence of solid contents higher than or equal to 5% by weight;
b) mixing said purge, at a temperature higher than or equal to 100° C., with a mixture of hydrocarbons, in the present text indicated as fluxing agent, having a total content of aromatic compounds ranging from 50% to 70% by weight (defined as aromaticity of the fluxing agent), and an initial boiling point equal to or higher than the temperature at which the mixing is carried out, so as to form a suspension with a content higher than or equal to 10% by weight of compounds having a boiling point $T_{bp}$ lower than or equal to 350° C.;

c) sending said suspension to a liquid-solid separation step, which operates at a temperature higher than or equal to 100° C., separating a solid phase containing a residual organic component and a solid component, in the present text indicated as cake, and a liquid phase containing residual solids;

d) cooling the solid phase thus obtained to below 60° C., including the upper extreme, and storing it, maintaining it at a temperature lower than or equal to 60° C.;

said process characterized in that the weight ratio between purge and fluxing agent ranges from 1:0.5 to 1:4; and the average residence time of the mixture during the mixing and before the liquid-solid separation is lower than or equal to 12 hours.

Advantageously, the process object of the present invention allows to obtain a product concentrated in solids, that shows characteristics of granular solid at normal storage temperatures, indicatively below or equal to 60° C. The granular solid after cooling, has the characteristic of being granular, non-sticky and flowing and can therefore be easily transported. In order to maintain this feature, the granular solid produced must be kept at a temperature lower than or equal to 60° C.

Further objectives and advantages of the present invention will appear more evident from the following description and enclosed figures, provided for purely illustrative and non-limiting purposes that represent preferred embodiments of the present invention.

FIG. 1 illustrates a preferred embodiment of the process according to the present invention according to a block scheme.

DETAILED DESCRIPTION

The present invention is now described in greater detail, which, as already mentioned, is a process for the treatment of refinery purge streams, which, for the purposes of the present invention, is a hydrocarbon stream in slurry phase having a boiling point higher than or equal to 140° C., characterized by the presence of quantities of asphaltenes higher than or equal to 5% by weight and characterized by the presence of solid contents higher than or equal to 5% by weight.

Said solids preferably contain carbonaceous residues, metallic compounds and catalysts in the form of particles, whose average diameter D50 measured is less than 1 mm. The diameter of the particles is measured with optical methods, such as "Focus Beam Reflectance Measurement", dispersing the purge in toluene at 10% w/w and stirring.

The metallic compounds are dispersed in the purge stream and are typically Ni sulfides, V sulfides, Fe sulfides, Molybdenum sulfides and mixtures thereof.

A stream in slurry phase, or purge, is mixed with a mixture of hydrocarbons at a temperature higher than 100° C., preferably ranging from 100° C. to 200° C., more preferably from 170° C. to 120° C. The mixture of hydrocarbons, or fluxing agent, has a total content of aromatic compounds ranging from 50% to 70% by weight (defined as aromaticity of the fluxing agent) and an initial boiling point equal to or higher than the temperature at which the mixing is carried out. After mixing, a suspension is formed with a content higher than or equal to 10% by weight of compounds having a boiling point $T_{bp}$ lower than or equal to 350° C.

Said suspension is then sent to a liquid-solid separation step, which operates at temperatures higher than or equal to 100° C., preferably at temperatures ranging from 100° C. to 200° C., more preferably ranging from 120° C. to 170° C. separating a solid phase containing a residual organic component and a solid component, in the present text indicated as cake, and a liquid phase containing residual solids.

The solid phase thus obtained is cooled to below 60° C., extreme included, and stored, keeping it at a temperature lower than or equal to 60° C.

During the mixing phase, the weight ratio between purge and fluxing agent must range from 1:0.5 to 1:4, preferably from 1:1 to 1:2. The average residence time of the mixture during the mixing and before the liquid-solid separation must be less than or equal to 12 hours, and is preferably less than or equal to 3 hours.

Preferred fluxing agents are selected from Vacuum Gas Oil (VGO) with a high content of aromatic compounds, High Vacuum Gas Oil with a reduced content of aromatic compounds (HGVO), gas oils deriving from Fluid Catalytic Cracking (FCC) such as Light Cycle Oil (LCO) and clarified oil (LCLO), and mixtures thereof.

An objective achieved with the present invention is to increase the viscosity of the residual organic component present in the cake separated, which englobes the solid particles initially present in the purge stream. An improvement in the rheology of the cake corresponds to an increase in the viscosity, so that the cake acquires an approximately "solid" consistency at the storage temperatures, typically lower than 60° C. (David Leinberger, "Temperature & Humidity in Ocean Containers" Feb. 27, 2006 ISTA). The means whereby the viscosity is increased, consists in an enrichment in asphaltenes of the hydrocarbon fraction, associated with the solids in the cake.

This phenomenon, for the purposes of the present invention, is defined as "mild destabilization of the asphaltenes" present in the purge stream. The mild destabilization of the asphaltenes is obtained by mixing the purge stream with an appropriate fluxing agent under suitable conditions. In particular, the fluxing agent must have a suitable content of aromatic compounds and distillation curve, upstream of the device for the solid-liquid separation. Furthermore, the fluxing agent must be added in such a quantity as to satisfy an appropriate weight ratio between purge stream and fluxing agent.

Operating under the conditions indicated in the process described and claimed, a suspension is obtained, having a content higher than or equal to 10%, of compounds having a boiling point lower than or equal to 350° C., preferably ranging from 15% to 50% by weight, more preferably ranging from 30% to 50% by weight. The content of said compounds always depends on the aromaticity of the fluxing agent.

The liquid-solid separation is preferably effected by means of filtration or using a centrifugal decanting device (centrifugation) which operates in temperature. The separation is followed by cooling of the cake obtained to below 60° C., upper extreme included.

It is consequently the nature of the fluxing agent that regulates the mild destabilization of the asphaltene components present in the purge stream, allowing an adequate concentration of the same in the cake phase.

It is important to observe that, according to the present process, the asphaltenes present in the purge stream do not precipitate completely, as is the case, on the other hand, in the treatment of the refinery purge streams known in the state of the art. In the process according to the present invention, the asphaltenes only precipitate in a sufficient quantity for increasing the viscosity of the cake produced, so as to make it a granular solid that can be stored at a temperature lower than or equal to 60° C.

After the solid-liquid separation, the separated liquid phase (clarified product) can be recirculated either to the process from which the purge stream derives, possibly after separating the fluxing agent by means of distillation, or it can be sent to another process present for example in a refinery.

The process of the present invention is aimed at separating a phase containing a granular solid with a solid content higher than or equal to 30% by weight.

An element that characterizes the invention is the rheology of the solid phase produced, which has the characteristic of being "shovelable" (semi-solid sludge) according to the definition contained in D.lgs. 152/2006. This type of solid is granular, it is non-sticky and flowing and can therefore be easily transported and/or stored. In order to preserve this feature, the granular solid produced must be maintained at a temperature lower than or equal to 60° C.

The solid produced is composed of granules whose average diameter varies within the range of 0.1 mm up to a maximum of 10 cm. These dimensions were obtained by means of sieving, using a stack of sieves having various meshes. These granules have much higher dimensions with respect to the granular solids traditionally present in purge streams.

The cake produced can be used as solid fuel, as charge for coke ovens, as charge for blast furnaces, or it can be destined for processes for the separation of metals (metal reclaiming processes) of possible metals present, such as, for example Vanadium and Nickel. A comparison with a similar purge stream subjected to Thermal drying or Pyrolysis, leads to a preference for using the cake obtained with the process according to the present invention in all applications in which the value of the stream of volatile hydrocarbons generated by the heating of the cake is maximized; whereas a material from Thermal Drying is preferred when the material must not generate volatile products during the heating.

Mild destabilization also positively influences the recovery degree of the solids, in any case already high when operating in temperature and by dilution of the purge with a solvent.

The cake produced acquires a granular form, during the various phases of the treatment, with dimensions also influenced by the concentration of solids and asphaltenes; the use of additional equipment is therefore not required for its granulation. Additional treatment such as, for example, sieving and/or briquetting treatment can be added if the final destination requires uniformity in the geometry and dimensions of the end-product. In the latter case, the hydrocarbon matrix present in the cake can exert a useful function as binder during forming, preferably carried out at temperatures higher than or equal to 60° C., more preferably ranging from 60° C. to 110° C.

A preferred embodiment of the process according to the present invention is described hereunder. With reference to FIG. 1, a purge stream (1) coming from hydroconversion processes in slurry phase, is fed to a mixer (A). A fluxing agent (2) is fed into the same mixer. After mixing, the suspension produced is sent to a solid-liquid separator (B), separating a diluted stream, also called clarified product (4), and a hot stream containing solids, also called cake (3). The hot cake is cooled in a cooling device (C) and subsequently sent for storage maintaining it at a temperature lower than or equal to 60° C. (D).

Some examples are provided hereunder for a better understanding of the invention and range of application, but in no way representing a limitation of the scope of the present invention.

Experimental tests were carried out on purge streams obtained during two different running cycles of a hydroconversion unit in slurry phase. Vacuum Gas Oil (VGO) with a high content of aromatic compounds, obtained from the same unit; a High Vacuum Gas Oil (HVGO) with a reduced content of aromatic compounds, obtained from a different Refinery unit (HVGO), and mixtures thereof, were used as fluxing agents, as indicated in Tables 2A and 2B for Examples 2 and 3. The main characteristics of the fluxing agents used are indicated in Table 1.

TABLE 1

Properties of the fluxing agents used, as resulting from the distillations simulated by means of gaschromatography.

|  |  | VGO Example C1 | VGO Example 1 | VGO Example C 2 | VGO Example 2 | VGO Example 3 | HVGO Examples 2 and 3 |
|---|---|---|---|---|---|---|---|
| Density | (kg/m$^3$) | 962 | 961 | 987 | 995 | 992 | 888 |
| % weight |  |  |  |  |  |  |  |
| IBP | (° C.) | 267 | 222 | 221 | 247 | 233 | 143 |
| 5% w |  | 290 | 276 | 284 | 301 | 293 | 228 |
| 10% w |  | 302 | 304 | 311 | 324 | 318 | 256 |
| 20% w |  | 319 | 336 | 342 | 354 | 348 | 288 |
| 30% w |  | 332 | 357 | 364 | 375 | 369 | 311 |
| 40% w |  | 342 | 375 | 382 | 393 | 387 | 331 |
| 50% w |  | 352 | 390 | 397 | 408 | 402 | 348 |
| 60% w |  | 362 | 404 | 411 | 422 | 416 | 366 |
| 70% w |  | 372 | 416 | 426 | 435 | 429 | 384 |
| 80% w |  | 383 | 429 | 441 | 449 | 444 | 405 |

TABLE 1-continued

Properties of the fluxing agents used, as resulting from the distillations simulated by means of gaschromatography.

|  | VGO Example C1 | VGO Example 1 | VGO Example C 2 | VGO Example 2 | VGO Example 3 | HVGO Examples 2 and 3 |
|---|---|---|---|---|---|---|
| 90% w | 398 | 446 | 461 | 467 | 462 | 434 |
| 95% w | 411 | 460 | 477 | 480 | 477 | 457 |
| FBP | 458 | 517 | 524 | 516 | 521 | 514 |
| Saturated (% w) products |  |  | 18.3 |  |  | 53.4 |
| Aromatics |  |  | 81.7 |  |  | 46.6 |

In Table 1, IBP is the Initial Boiling Point, FBP indicates the Final Boiling Point.

The mixing device consists of an accumulation tank of the charge, with a conical bottom, equipped with a double-impeller stirrer and traced with Medium Pressure Steam, which receives and mixes the purge and fluxing streams, at a known flow-rate. The fluxed mixture is sent, by means of an eccentric-rotor volumetric pump, to an inertized centrifugal decanting device, with a drum having an internal diameter of 230 mm and capable of operating at a maximum rate of 5,200 rpm, separating the cake from the clarified product.

The cake thus obtained is cooled on a double-helix cooling cochlea, equipped with an outer jacket and hollow water-cooled shafts. The final product is then collected in drums and stored. The clarified product is collected in a tank which, in turn, is stirred with a single-impeller stirrer. The clarified product can be sent from this tank to other uses in the refinery or recycled to the process from which the purge derives. Samples are collected from the purge and flushing streams, for characterization, in addition to cake samples in the drums and samples of clarified product, sampled immediately downstream of the outlet of the decanting device, before reaching the storage tank. In correspondence with each change in composition and/or operational conditions, the system is left to run for at least 12 hours, in order to stabilize the composition of the treated stream. The residence times indicated hereunder are obtained by dividing the level of liquid in the charge storage tank by the flow-rate fed to the decanting device.

Comparative Example 1 (C1): Fluxing of the Purge without Mild Destabilization 450 kg/h of a mixture containing purge and VGO, mixed at a temperature of 155° C. with a weight fluxing ratio between purge and VG0 of 1:1.4, are fed to a centrifugal decanting device. The cake produced, after cooling to room temperature, proves to be pasty. No formation is observed of asphaltene deposits on the bottom of the collection tank of the clarified product. The compositions of the fluxed charge, clarified product and cake produced are indicated in Table 2B.

Example 1: Mild Destabilization Through a Different Distillation Curve 472 kg/h of a mixture containing purge and VGO, mixed at a temperature of 155° C., with a weight fluxing ratio between purge and VGO of 1:1.2, are fed to a centrifugal decanting device. With respect to the comparative example, the fluxed mixture has a different distillation curve with respect to the maltene fraction. The cake produced, after cooling to room temperature, has a solid and fine grain appearance.

The compositions of the fluxed charge, clarified product and cake produced are indicated in Table 2A.

An examination of the particle-size distribution of the THF-i in the charge and in the cakes of Examples 1 and 2, Table 3, does not show any significant differences; the different appearance of the cake is not due to a different particle size of the THF-i fed, but an increase in both the THF-i and Asf-05 in the cakes produced can be observed.

Comparative Example 2 (C2): Fluxing of the Purge without Mild Destabilization 440 kg/h of a mixture containing purge and VGO, mixed at a temperature of 155° C., with a weight fluxing ratio between purge and VGO of 1:2, are fed to a centrifugal decanting device. The cake produced, after cooling to room temperature, proves to be pasty. No formation is observed of asphaltene deposits on the bottom of the collection tank of clarified product. The compositions of the fluxed charge, clarified product and cake produced are indicated in Table 2B.

Example 2: Decrease in the Aromaticity of the Fluxing Agent (Intermediate Cake 451 kg/h of a purge mixed with a fluxing agent consisting of a mixture containing 22% of HVGO and 78% of VGO, in which a weight fluxing ratio between purge and fluxing agent of 1:2, are fed to a centrifugal decanting device. The mixing takes place at a temperature of 156° C. The cake produced, after cooling to room temperature, proves to be granular but not flowing, with a tendency to re-agglomerate in the storage drum. No formation is observed of deposits in the collection tank of clarified product.

The compositions of the fluxed charge, clarified product and cake produced are indicated in Table 2A.

Example 3 Further Decrease in the Aromaticity of the Fluxing Agent (Granular Cake 451 kg/h of mixture containing a purge and fluxing agent at a temperature of 155° C. with a weight fluxing ratio between purge and fluxing agent of 1:2, and a fluxing agent consisting of a mixture containing 41% of HVGO and 59% of VGO, are fed to a centrifugal decanting device. The cake produced, after cooling to room temperature, proves to be granular, without the tendency to re-agglomerate in the storage drum. No formation is observed of deposits in the collection tank of clarified product. The compositions of the fluxed charge, clarified product and cake produced are indicated in Table 2A. It should be noted that, also in this example, an increase in the solid content in the cake does not correspond to an improvement in the rheology, as the cakes from comparative Examples 1 and 2, although characterized by a higher solid content, have a pasty consistency.

TABLE 2A

|  |  |  | Example |  |  |
|---|---|---|---|---|---|
|  |  |  | 1 A | 2 B | 3 B |
| Purge | Solids | (% w) | 9.2 | 8.4 | 7.2 |
|  | Asphaltenes | (% w) | 28.2 | 34.9 | 31.4 |
| Fluxing agent | HVGO | (% w) | 0% | 22% | 41% |
|  | VGO | (% w) | 100% | 78% | 59% |
|  | Aromaticity of the fluxing agent | (% w) |  | 74(*) | 67(*) |
|  | IBP-350° C. | (% w) | 26% | 26% | 33% |
|  | Compounds with $T_{bp}$ 350-500 | (% w) | 73% | 73% | 66% |
|  | Compounds with $T_{bp}$ 500+ | (% w) | 1% | 1% | 1% |
| Feeding to decanter | Flow-rate | (kg/h) | 472 | 451 | 451 |
|  | Fluxing agent/purge | (w/w) | 2.2 | 2.1 | 2.0 |
|  | Average residence time in the accumulation tank | (hour) | 2 | 1 | 1 |
|  | THF-i | (% p) | 3% | 3% | 4% |
|  | Asf-C5 | (% w including THF-i) | 6% | 18% | 16% |
|  |  | (% w excluding THF-i) | 7% | 18% | 16% |
|  | IBP-350° C. | (% w) | 17% | 12% | 18% |
|  | Compounds with $T_{bp}$ 350-500 | (% w) | 63% | 48% | 43% |
|  | Compounds with $T_{bp}$ 500+ | (% w) | 11% | 20% | 21% |
| Cake | Flow-rate | (kg/h) | 19 | 18 | 23 |
|  | Rheology |  | solid | inter-mediate | solid |
|  | THF-i | (% w) | 70% | 51% | 55% |
|  | Asf-C5 | (% w THF-i included) | 6% | 10% | 10% |
|  |  | (% w excluding THF-i) | 19% | 20% | 23% |
|  | Enrichment of asphaltenes (excluding THF-i) | cake/feeding to the decanter | 2.9 | 1.1 | 1.4 |
| Clarified product | Flow-rate of the clarified product | (kg/h) | 454 | 433 | 428 |
|  | THF-i | (% w) | 0.4% | 1% | 1% |
|  | Asf-C5 | (% w) | 6% | 18% | 16% |

(*)for the VGO component, the same aromaticity as the VGO from Example 3 is considered.

TABLE 2B

|  |  |  | Example |  |
|---|---|---|---|---|
|  |  |  | C1 A | C2 B |
| Purge | Solids | (% w) | 8.7 | 7.4 |
|  | Asphaltenes | (% w) | 30.3 | 36.1 |
| Fluxing agent | HVGO | (% w) | 0% | 0% |
|  | VGO | (% w) | 100% | 100% |
|  | Aromaticity of the fluxing agent | (% w) |  | 82 |
|  | IBP-350° C. | (% w) | 47% | 19% |
|  | Compounds with $T_{bp}$ 350-500 | (% w) | 53% | 79% |
|  | Compounds with $T_{bp}$ 500+ | (% w) | 0% | 3% |
| Feeding to decanter | Flow-rate | (kg/h) | 450 | 440 |
|  | Fluxing agent/purge | (w/w) | 1.4 | 2.1 |
|  | Average residence time in the accumulation tank | (hours) | 2 | 1 |
|  | THF-i | (% w) | 3% | 3% |
|  | Asf-C5 | (% w including THF-i) | 6% | 17% |
|  |  | (% w excluding THF-i) | 6% | 17% |
|  | IBP-350° C. | (% w) | 28% | 7% |
|  | Compounds with $T_{bp}$ 350-500 | (% w) | 51% | 51% |
|  | Compounds with $T_{bp}$ 500+ | (% w) | 12% | 22% |
| Cake | Flow-rate | (kg/h) | 18 | 14 |
|  | Rheology |  | pasty | pasty |
|  | THF-i | (% w) | 61% | 57% |
|  | Asf-C5 | (% w including THF-i) | 3% | 7% |
|  |  | (% w excluding THF-i) | 8% | 17% |
|  | Enrichment of Asphaltenes (THF-i) | cake/feeding to the decanter | 1.2 | 1 |
| Clarified product | Flow-rate of the clarified product | (kg/h) | 432 | 427 |
|  | THF-i | (% w) | 0.5% | 2% |
|  | Asf-C5 | (% w) | 7% | 17% |

(*) for the VGO component the same aromaticity as the VGO from Example 3 is considered.

TABLE 3

Particle size of the solids present in the purge and cake

| | Particle Diameter (microns) | | | | | |
|---|---|---|---|---|---|---|
| | Purge | | | Cake | | |
| Example | D(10) | D(50) | D(90) | D(10) | D(50) | D(90) |
| 1 | 6 | 11 | 21 | 4 | 8 | 17 |
| 2 | 6 | 12 | 22 | 4 | 8 | 17 |

D(90) = diameter below which 90% of the particle population is found
D(50) = diameter below which 50% of the particle population is found
D(10) = diameter below which 10% of the particle population is found As explained in the text of the patent application, the diameter D50 of solids contained in the purge is measured by means of optical methods, such as "Focus Beam Reflectance Measurement", by dispersing the purge in 10% w/w of toluene under stirring. The average diameter of the granules produced is measured using a stack of sieves having various meshes.

The invention claimed is:
1. A process for the treatment of refinery purge streams, the process comprising:

a) withdrawing a refinery purge stream comprising a hydrocarbon component in slurry phase having a boiling point higher than or equal to 140° C., characterized by the presence of quantities of asphaltenes higher than or equal to 5% by weight and characterized by the presence of solid contents greater than or equal to 5% by weight;

b) mixing said purge, at a temperature higher than or equal to 100° C., with a fluxing agent, having a total content of aromatic compounds ranging from 50% to 70% by weight, and an initial boiling point equal to or higher than the temperature at which the mixing is carried out, wherein the fluxing agent is a mixture of Vacuum Gas Oil (VGO) and High Vacuum Gas Oil, so as to form a suspension with a content higher than or equal to 10% by weight of compounds having a boiling point $T_{bp}$ lower than or equal to 350° C.;

c) sending said suspension to a liquid-solid separation step, which operates at a temperature higher than or equal to 100° C., separating a solid phase comprising a residual organic component and a solid component, or cake, and a liquid phase comprising residual solids;

d) cooling the solid phase thus obtained to 60° C. or less, and storing it, maintaining it at a temperature lower than or equal to 60° C.;

wherein a weight ratio between purge and fluxing agent ranges from 1:0.5 to 1:4; and an average residence time of the mixture during the mixing and before the liquid-solid separation is lower than or equal to 12 hours.

2. The process according to claim 1, wherein the solids contained in the purge stream comprise carbonaceous residues, metallic compounds and catalysts in the form of particles having a D50 lower than or equal to 1 mm.

3. The process according to claim 1, wherein the average residence time of the mixture during the mixing is lower than or equal to 3 hours.

4. The process according to claim 1, wherein the metallic compounds contained in the purge are either Ni sulfides, or V sulfides, or Fe sulfides or mixtures thereof.

5. The process according to claim 1, wherein the mixing temperature ranges from 100° C. to 200° C.

6. The process according to claim 1, wherein the solid-liquid separation takes place at temperatures ranging from 100 to 200° C.

7. The process according to claim 1, wherein the suspension has a content ranging from 15% to 50% of compounds having a boiling point lower than or equal to 350° C.

8. The process according to claim 1, wherein the weight ratio between purge and fluxing agent ranges from 1:1 to 1:2.

* * * * *